US006949963B2

(12) United States Patent
De Haas et al.

(10) Patent No.: US 6,949,963 B2
(45) Date of Patent: Sep. 27, 2005

(54) LINE DRIVER WITH CURRENT SOURCE OUTPUT AND HIGH IMMUNITY TO RF SIGNALS

(75) Inventors: Clemens Gerhardus Johannes De Haas, Nijmegen (NL); Hendrik Boezen, Nijmegen (NL); Aloysius Johannes Maria Boomkamp, Nijmegen (NL); Gerrit Jan Bollen, Nijmegen (NL); Abraham Klaas Van Den Heuvel, Nijmegen (NL); Ruurd Anne Visser, Nijmegen (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 322 days.

(21) Appl. No.: 10/095,348

(22) Filed: Mar. 11, 2002

(65) Prior Publication Data

US 2002/0154651 A1 Oct. 24, 2002

(30) Foreign Application Priority Data

Mar. 12, 2001 (EP) .......................................... 01200908

(51) Int. Cl.⁷ ............................................... H03K 3/00
(52) U.S. Cl. ........................ 327/108; 327/109; 327/112
(58) Field of Search ................................ 327/108, 109, 327/112; 326/81, 82, 83, 84, 85, 87, 88, 91

(56) References Cited

U.S. PATENT DOCUMENTS 5,061,861 A * 10/1991 Sameshima et al. ........ 327/109
5,640,357 A * 6/1997 Kakimi ....................... 365/229
5,739,712 A * 4/1998 Fujii .......................... 327/323
6,215,338 B1 * 4/2001 Gervasi et al. .............. 327/108
6,590,368 B2 * 7/2003 Tanaka et al. ............... 323/268

FOREIGN PATENT DOCUMENTS

EP 0705008 A2 4/1996 ........... H04L/25/02

OTHER PUBLICATIONS

Radio Shack Dictionary of Electronics, 1977, 5th Edition, Howard W. Sams &Co., Inc.*

* cited by examiner

Primary Examiner—Tuan T. Lam
Assistant Examiner—Hiep Nguyen
(74) Attorney, Agent, or Firm—Adam Stroud

(57) ABSTRACT

Line driver for a LIN-bus. The line driver has a current source output transistor (T1) for pulling down the LIN-bus wire (LB) to ground (GND). The LIN-bus wire (LB) is connected to a positive supply voltage (VBAT) through a pull-up resistor (R1). The output transistor (T1) is driven by a driver stage (DRV) in response to an input current (J1) at an input node (X). The driver stage has a further resistor (R2) connected between the gate of the output transistor (T1) and a reference terminal (GND), a reference transistor (T2) which has its source connected to the reference terminal (GND) and its drain coupled to the input node (X); the gates of the output transistor (T1) and the reference transistor (T2) are connected to an output (DAO1) of a differential amplifier (DA1) which has an inverting input (DAN1) coupled to a bias voltage source (E2) and a non-inverting input (DAP1) coupled to the input node (X). The further resistor (R2) stage provides a low-impedance path to ground for RF disturbances reaching the gate of the output transistor (T1) through the drain-gate capacitance of the output transistor (T1) and prevents these disturbances from penetrating the driver stage.

4 Claims, 5 Drawing Sheets

LINE DRIVER WITH CURRENT SOURCE OUTPUT AND HIGH IMMUNITY TO RF SIGNALS

The invention relates to line drivers, in particular to a driver for the LIN-bus (Local Interconnect Network). The LIN-bus is used in automotive applications and is a concept of a single master and multiple slaves connected to a single bus wire. The bus wire is connected to a supply voltage which is positive relative to ground by means of an external pull-up resistor which keeps the bus wire in a recessive voltage level corresponding to a relatively high positive voltage near to the positive supply voltage. The master and the slaves have a built-in line driver for pulling down the bus wire voltage to a dominant voltage level corresponding to a relatively low positive voltage near to ground level in response to a data signal.

The EMI (Electro Magnetic Immunity) performance of a LIN bus driver used in an automotive environment is a very important parameter. RF (Radio Frequency) disturbances on the line driver output can result in misinterpretation of the recessive and dominant voltage levels, or can result in an asymmetrical propagation delay between the rising and falling edges of the LIN-bus signals, which causes a duty cycle different from the desired 50%. Both can be a cause for faulty communication.

A current source output stage is a good choice with respect to EMI. Such a current source output stage allows the RF disturbances to be superimposed on the original LIN-bus signal. The RF disturbances can be filtered out by means of low-pass filters at the inputs of the receivers. However, the RF disturbances not only reach the inputs of the receivers, but also penetrate into the driver stage of the current source output stage of the line driver, mainly through the drain-gate or collector-base capacitance of the output transistor of the current source output stage, and can cause unwanted intermodulation effects or oscillations.

It is an object of the invention to provide a line driver which is robust and has a high immunity to penetrating RF signals. According to the invention this object is achieved by a line driver comprising:

a driver output terminal for connection to a line to be driven;

a reference terminal for connection to a reference voltage;

a current source output transistor having its first main electrode coupled to the reference terminal and its second main electrode coupled to the driver output terminal for providing between the driver output terminal and the reference terminal a current which is substantially proportional to an input signal; and a driver stage for providing a drive signal for a control electrode of the current source output transistor in response to the input signal, the driver stage comprising:

a first resistor connected between the control electrode of the current source output transistor and the reference terminal, a reference transistor having a control electrode, a first main electrode connected to the reference terminal and a second main electrode coupled to an input node, the input node being connected to receive the input signal, the control electrode of the current source output transistor and the control electrode of the reference transistor being connected to receive an output signal from an output of a first differential amplifier having an inverting input coupled to a bias voltage source and a non-inverting input coupled to the input node.

The first resistor of the driver stage provides a low-impedance path to ground for RF disturbances reaching the control electrode of the current source output transistor through the capacitance between the second main electrode and the control electrode of the current source output transistor and prevents these disturbances from penetrating the driver stage. The reference transistor and the current source output transistor are scaled copies of each other. Therefore, the current flowing through the current source output transistor is proportional to the current flowing through the reference transistor. The first differential amplifier keeps the voltage at the input node at a level dictated by the bias voltage source and provides a drive signal to the gates of the current output transistor and the reference transistor in such manner that the output current provided by the current output transistor is proportional to the input signal.

The immunity to penetrating RF signals can be enhanced by the embodiment as claimed in claim 2. In this embodiment the reference transistor and the output transistor have separate resistors between their control electrodes and the reference terminal and also have separate differential amplifiers having inputs connected to the same bias voltage source and the same input signal. This dual driver concept improves the suppression of unwanted RF signals.

The embodiment of claim 3 is a very simple transistor implementation of the dual driver concept.

The embodiment of claim 4 provides a quick charging of any parasitic capacitance at the input node and prevents delay when the input signal for the driver stage is a current which changes in response to a data signal.

These and other aspects of the invention will now be described and elucidated with reference to the accompanying drawings, in which FIG. 1 shows a schematic diagram of a LIN bus and signals occurring in the LIN bus;

In these Figures like parts bear like reference symbols.

Figure 1:
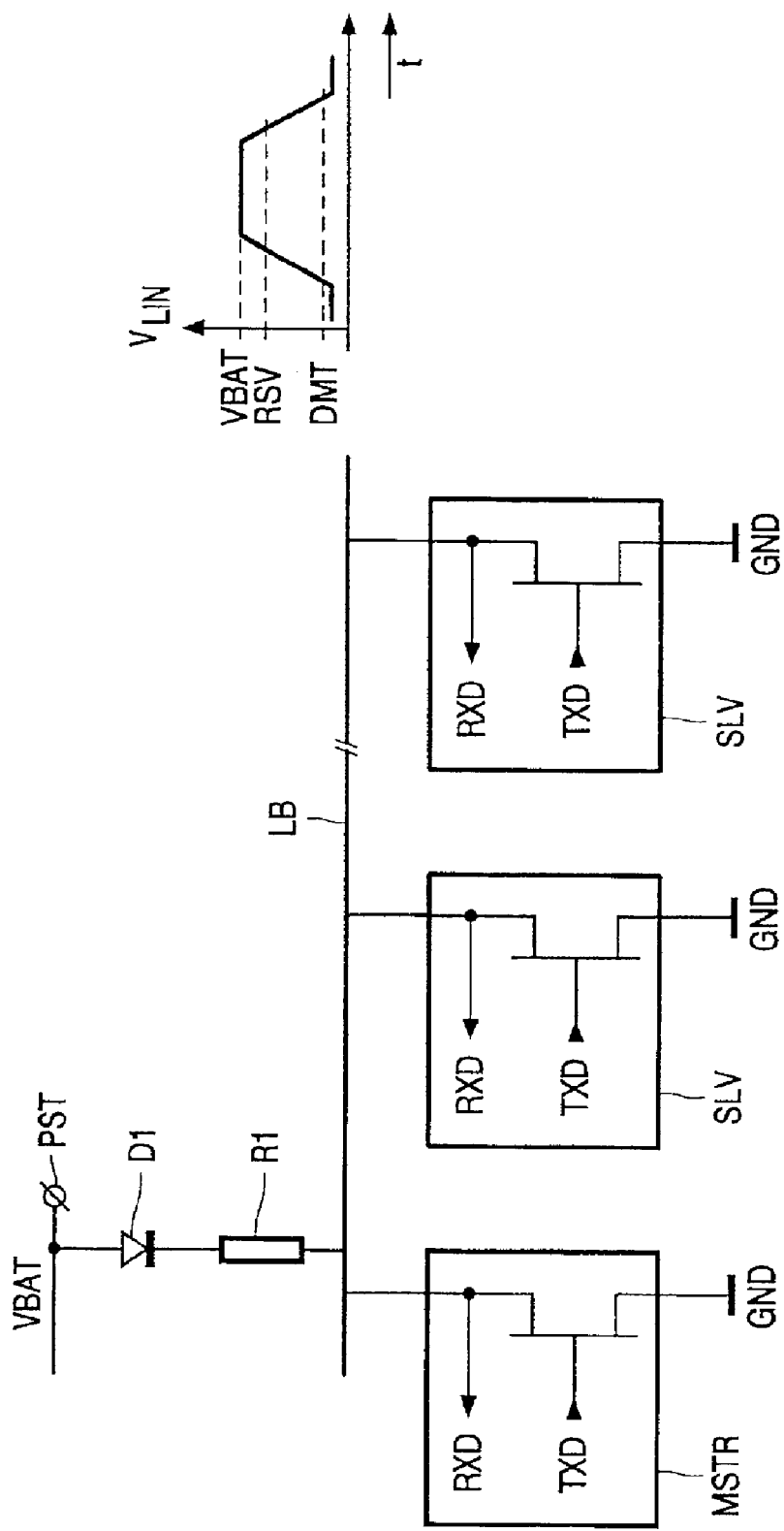

The line driver according to the invention is particularly useful in the LIN-bus (Local Interconnect Network) which is used, for example, in automotive applications. FIG. 1 shows a schematic diagram of a LIN-bus and signals occurring in the LIN-bus. The LIN-bus is a concept of a single master node MSTR and multiple slave nodes SLV connected to a single LIN-bus wire LB. The LIN-bus wire LB is connected to a positive supply terminal PST by means of a pull-up resistor R1 in series with a decoupling diode D1. The decoupling diode D1 prevents current flowing from the LIN-bus wire LB to the positive supply terminal PST. The positive supply terminal PST receives a positive supply voltage VBAT relative to a reference terminal GND which serves as signal ground. The pull-up resistor R1 keeps the bus wire at a recessive voltage level RSV corresponding to a relatively high voltage near to the positive supply voltage VBAT. The master and slave nodes have a built-in line driver for pulling down, when a data signal TXD is being transmitted, the LIN-bus wire voltage $V_{LIN}$ to which a dominant voltage level DMT corresponds to a relatively low voltage near to ground level in response to the data signal TXD. Each node also has a built-in receiver (not shown) which processes the signal RXD received from a transmitting node.

The EMI (Electro Magnetic Immunity) performance of a LIN transceiver used in an automotive environment is a very important parameter. RF (Radio Frequency) disturbances on the line driver output can result in misinterpretation of the recessive and dominant voltage levels, or can result in an asymmetrical propagation delay between the rising and falling edges of the LIN-bus signals, which causes a duty cycle different from the desired 50%. Both can be a cause for faulty communication. A line driver with a current source output stage is a good choice with respect to EMI. Such a current source output stage allows the RF disturbances to be superimposed on the original LIN-bus signal. The RF disturbances can be filtered out by means of low-pass filters at the inputs of the receivers.

Figure 2:
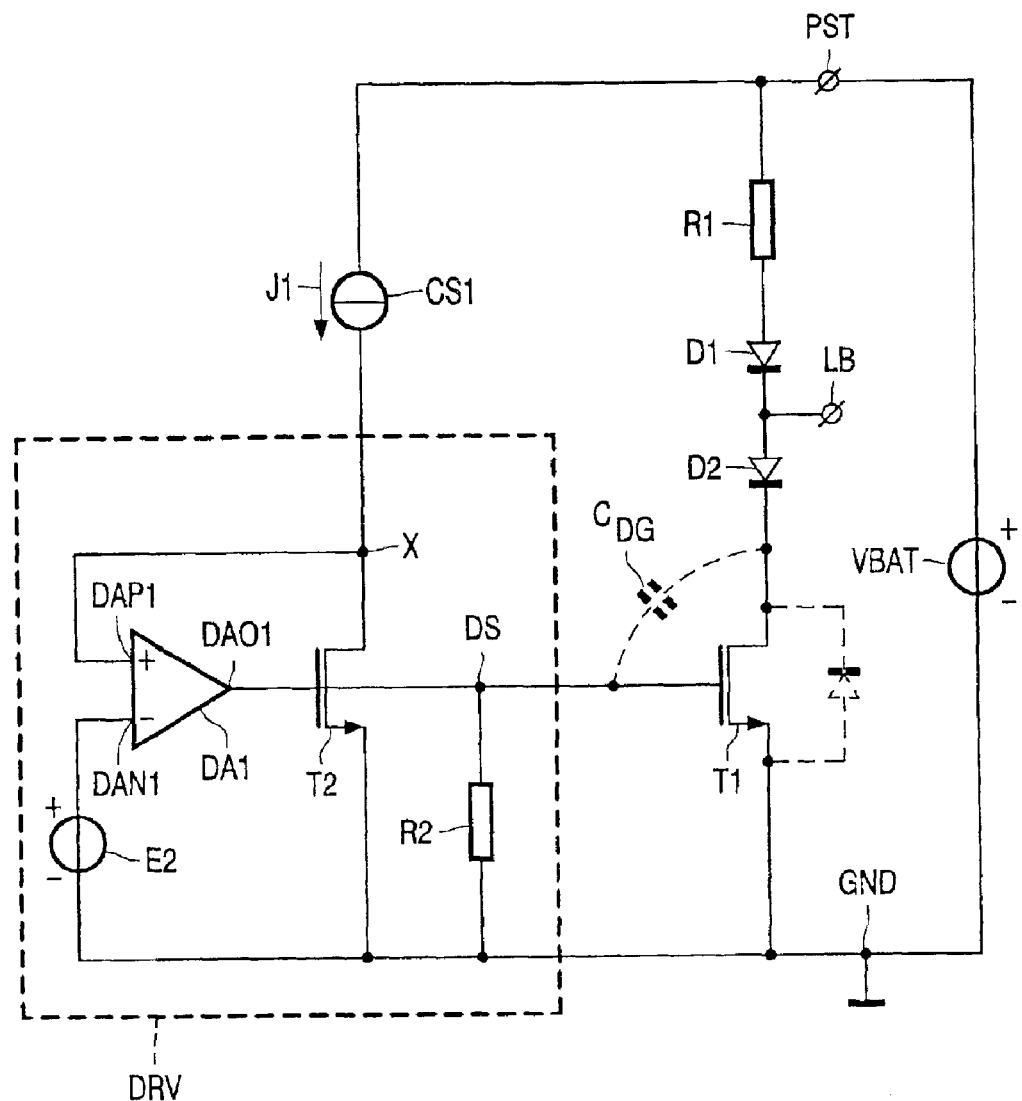
FIG. 2 shows a circuit diagram of a first embodiment of a line driver according to the invention.

FIG. 2 shows a line driver with a current source output stage. The pull up resistor R1 and decoupling diode D1 connect the LIN-bus wire LB to the positive supply voltage terminal PST. A current source transistor T1 in series with a diode D2 are connected between the reference terminal GND and the LIN-bus wire LB. The first main electrode or source of the current source transistor T1 is connected to the reference terminal GND and the second main electrode or drain is connected to the LIN-bus wire LB through the diode D2. Diodes D1 and D2 prevent current flowing from the LIN-bus wire LB to the positive supply terminal PST or to the reference terminal GND. Diode D2 is necessary because of the parasitic diode present in the current source transistor T1.

The line driver further comprises a driver stage DRV which drives the control electrode or gate of the current source transistor T1 with a drive signal DS in such manner that the output current provided by transistor T1 is proportional to a current J1 supplied by a current source CS1 to an input node X of the driver stage DRV. The output current pulls down the LIN-bus wire LB with a well-defined linear transition for good EME (Electro Magnetic Emission) performance.

The driver stage DRV is implemented with a first resistor R2, a reference transistor T2 which is a scaled copy of the current source output transistor T1, a differential amplifier DA1, and a bias voltage source E2. The resistor R2 is connected between the gate of the current source output transistor T1 and the reference terminal GND. The differential amplifier DA1 has an inverting input DAN1 coupled to the bias voltage source E2. The input node X is coupled to a non-inverting input DAP1 of the differential amplifier DA1. The reference transistor T2 has its source connected to the reference terminal GND, its drain coupled to the input node X. The gate of the current source output transistor T1 and the gate of the reference transistor T2 are both connected to an output DAO1 of the differential amplifier DA1. Due to the scaling the drain current of the current source output transistor T1 is proportional to the drain current of the reference transistor T2, which in turn is equal to the current J1 supplied by the current source CS1.

The differential amplifier DA1 keeps the voltage at the input node X at a level dictated by the bias voltage source E2 and provides a drive signal to the gates of the transistors T1 and T2 in such manner that the output current provided by transistor T1 is proportional to the current from the current source CS1. The resistor R2 provides a low-impedance path to signal ground for RF signals on the LIN-bus wire LB, unwanted penetrating through diode D2 and the drain-gate capacitance CDG of the current source output transistor T1. The resistor R2 limits the rising output impedance of the differential amplifier DA1 at higher frequencies and prevents modulation of the drive signal DS by the penetrating RF disturbances.

Figure 3:
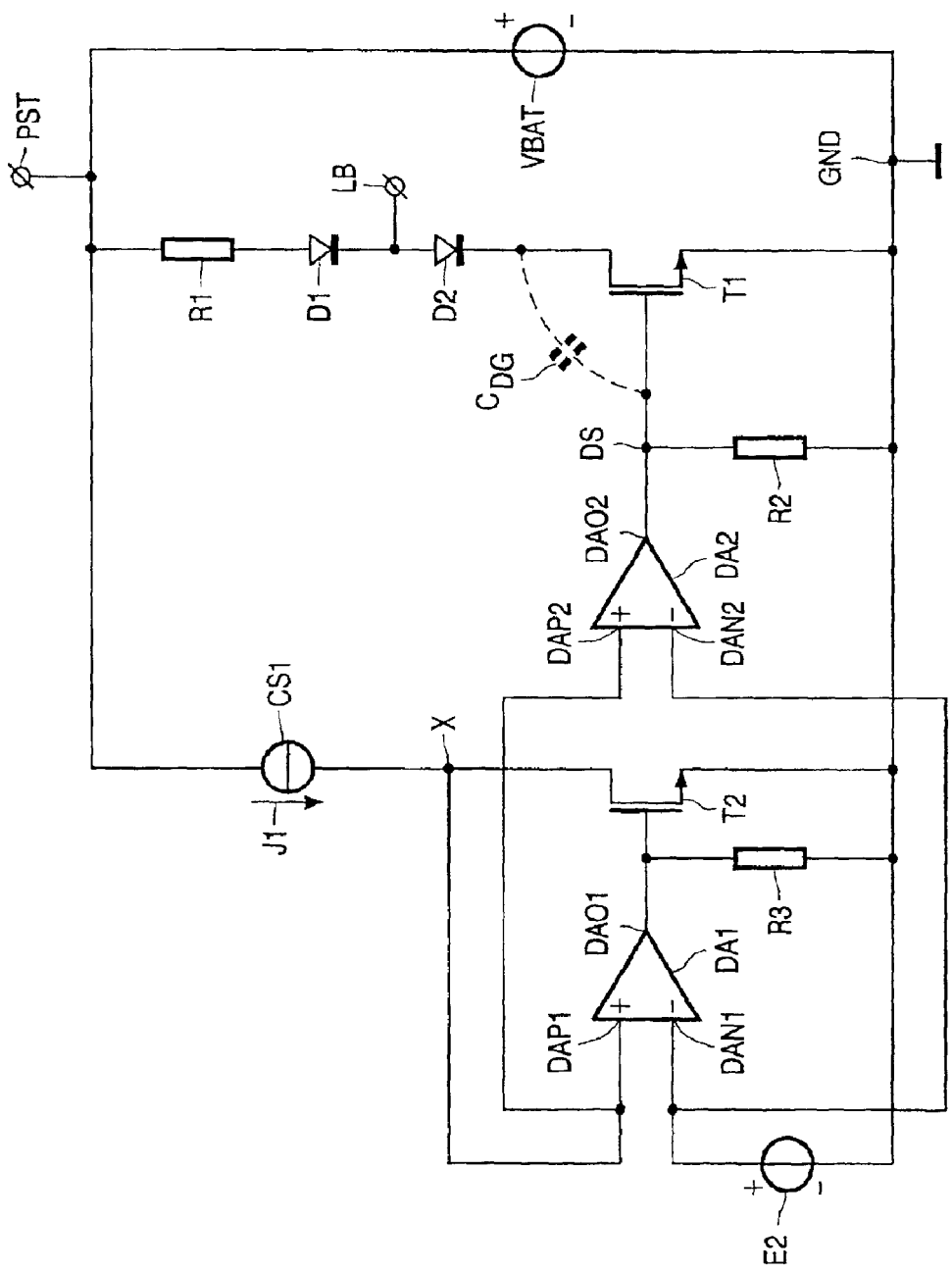
FIG. 3 shows a circuit diagram of a second embodiment of a line driver according to the invention.

FIG. 3 shows an embodiment with improved immunity against penetrating RF signals through the drain-gate capacitance $C_{DG}$ of the current source output transistor T1. The driver stage DRV has a second resistor R3 connected between the control electrode of the reference transistor T2 and the reference terminal GND, and a second differential amplifier DA2. The second differential amplifier DA2 has an inverting input DAN2 and a non-inverting input DAP2 coupled to the inverting input DAN1 and non-inverting input DAP1, respectively, of the first differential amplifier DA1. The control electrode of the output current source transistor T1 is connected to an output DAO2 of the second differential amplifier DA2 and the control electrode of the reference transistor T2 is connected to the output DAO1 of the first differential amplifier DA1. In this embodiment the reference transistor T2 and the current source output transistor T1 have separate resistors between their control electrodes and the reference terminal GND and also have separate differential amplifiers having inputs connected to the same bias voltage source and the same input signal. This dual driver concept improves the suppression of unwanted RF signals.

Figure 4:
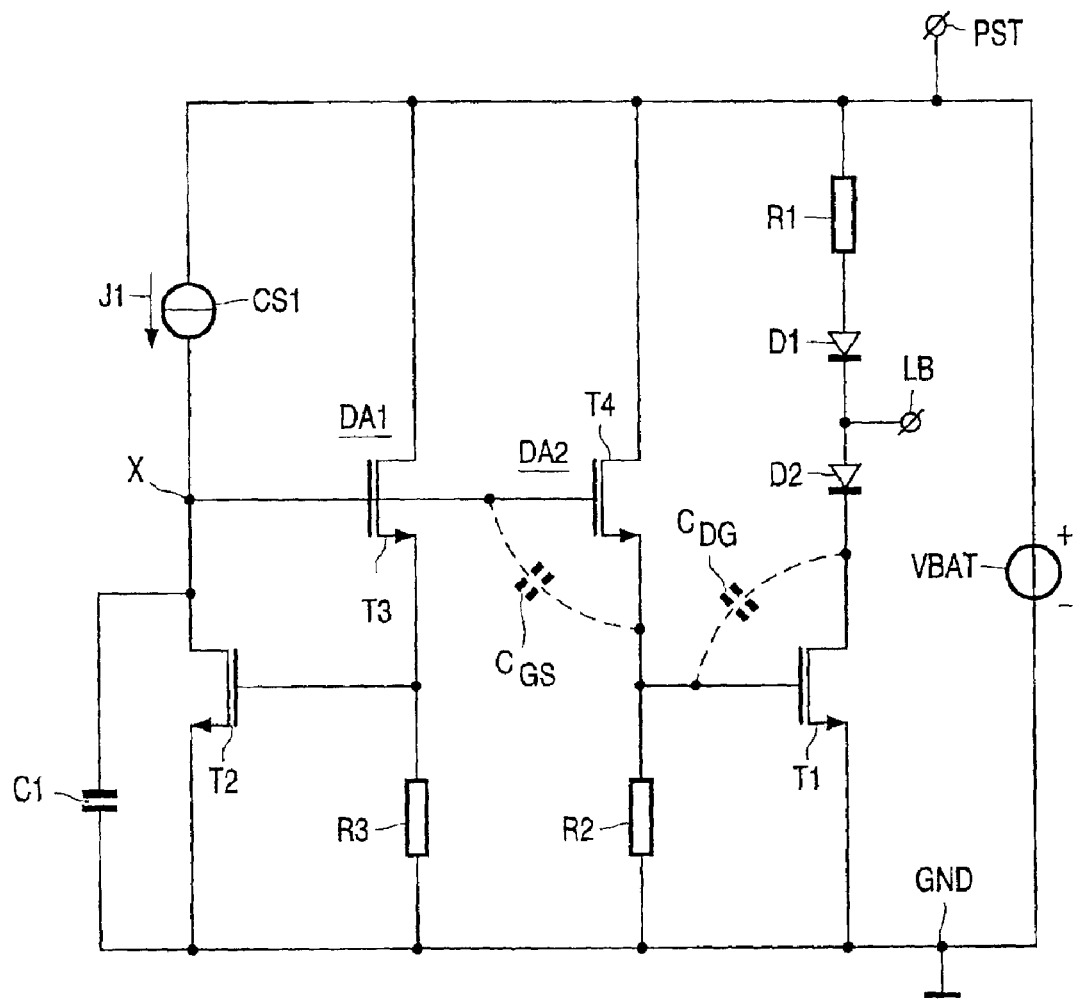
FIG. 4 shows a circuit diagram of a third embodiment of a line driver according to the invention.

FIG. 4 shows a simple transistor embodiment of the dual driver concept of FIG. 3. The first differential amplifier DA1 is implemented with transistor T3 and the second differential amplifier DA2 is implemented with transistor T4. The gates of the transistors T3 and T4 are connected to the input node X and the drains of the transistors T3 and T4 are connected to the positive supply terminal PST. The source of transistor T4 is connected to the first resistor R2 and drives the gate of the current source output transistor T1. The source of transistor T3 is connected to the second resistor R3 and drives the gate of the reference transistor T2. The sum of the gate-source voltages of the transistors T2 and T3 replaces the bias voltage source E2 and dictates the voltage at the input node X. A capacitor C1, connected between the input node X and the reference terminal GND, is added to block any RF signal that could be transferred to the input node X through the drain-gate capacitance $C_{DG}$ of the current source output transistor T1 and the gate-source capacitance $C_{GS}$ of the transistor T4.

Figure 5:
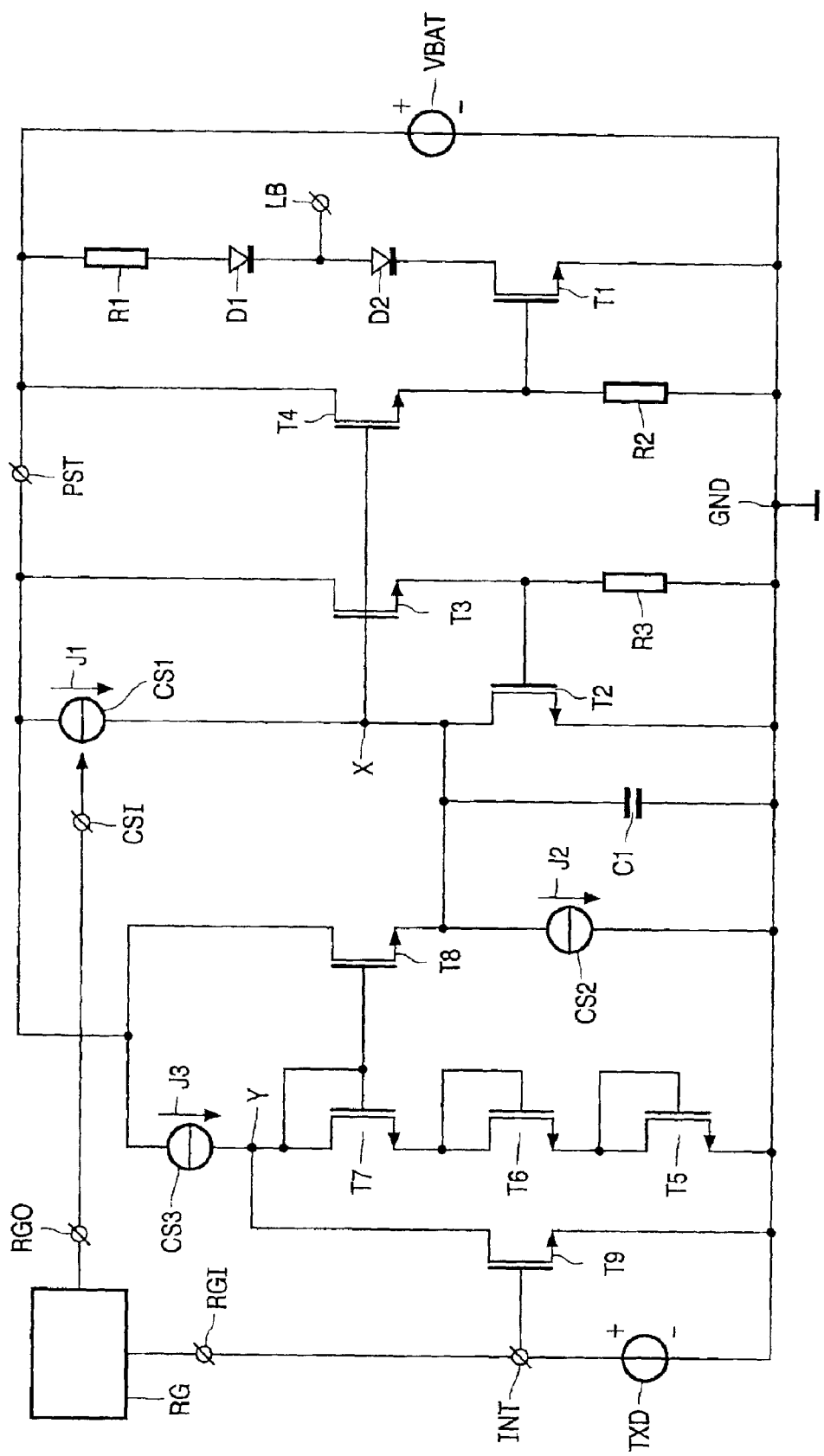
FIG. 5 shows a circuit diagram of a fourth embodiment of a line driver according to the invention.

FIG. 5 shows a further elaborated embodiment. It has an input terminal INT for receiving the data signal TXD. A first current source CS1 is coupled to the input node X and supplies a current J1 in response to the data signal. The current is ramp shaped as shown for $V_{LIN}$ in FIG. 1. A ramp generator RG has an input RGI coupled to the input terminal INT for receiving the data signal TXD and has an output RGO for supplying a ramp signal in response to the data signal. The first current source CS1 has a control input CS1 coupled to the output RGO of the ramp generator RG and supplies the ramp shaped current to the input node X. When the current J1 starts ramping up from zero, it has to charge the capacitance C1 and any parasitic capacitance at the input node X. This causes unwanted delay, which delay is prevented by an extra charger circuit. For this purpose a transistor T8 is connected between the supply voltage terminal PST and the input node X. A bias current source CS2 is coupled between the input node X and the reference terminal GND for supplying a bias current J2 to the transistor T8. A series arrangement of a transistor T7, a transistor T6 and a transistor T5 is connected between a further node Y and the reference terminal GND. The transistors T5, T6 and T7 each have its gate connected to its drain, the gate of the transistor T7 is connected to the gate of the transistor T8 and the drain of the transistor T7 is connected to the further node Y. A bias current source CS3 is coupled between the supply voltage terminal PST and the further node Y and supplies a bias current J3 to the further node Y. A transistor T9 is connected between the further node Y and the reference terminal GND and has its gate coupled to the input terminal INT for receiving the digital data signal TXD.

When the digital data signal TXD is higher than the threshold voltage $V_T$ of transistor T9 (digital "1"), the current J3 from current source CS3 entirely runs through transistor T9 thereby making the voltage at the further node Y zero and making the current through the transistors T5 to T8 also zero. At the same time the ramp generator RG drives current source CS1 to have zero current J1. Current source CS2 pulls the voltage on node X to zero and ensures that the current source output transistor T1 is switched off completely. The voltage $V_{LIN}$ on the LIN bus LB then equals the supply voltage VBAT.

When the digital data signal TXD changes to a value lower than the threshold voltage $V_T$ of transistor T9 (digital "0"), transistor T9 is cut off and the current J3 from current source CS3 flows through the transistors T5, T6 and T7 and creates a bias voltage on the gate of transistor T8 equal to three gate-source voltages $3*V_{GS}$. It is further assumed that transistor T5 is matched with transistor T1, transistor T6 is matched with transistor T3 and transistor T7 is matched with transistor T8. Then the source of transistor T8 is in effect a voltage source with a voltage equal to the sum of the gate-source voltages of the transistors T5 and T6, which quickly charges the capacitance at the input node X. The transistors T5 and T6 are scaled such that just no current flows through the transistors T1 and T2. The digital "0" at the input RGI of the ramp generator RG causes an increasing ramp signal at the output RGO and the current J1 of current source CS1 will increase and will charge the capacitance at the input node X above the sum of the gate-source voltages of the transistors T5 and T6, and after a short time the transistors T1 and T2 start conducting. So, without any significant delay, the current through the current source output transistor T1 will increase and will pull down the voltage on the LIN bus LB until it reaches ground level. The voltage on the LIN bus LB makes a transition from the level of the supply voltage VBAT to ground level.

A change in the data signal TXD back to a digital "1" reverses the process. The voltage source made from transistor T8 is switched off by transistor T9 and the ramp generator RG decreases the current J1 to zero, enabling the voltage on the LIN bus LB to turn back to the level of the supply voltage VBAT. The voltage on the LIN bus LB makes a transition from the ground level to the level of the supply voltage VBAT.

In the embodiments unipolar or MOS transistors have been shown by way of example. Bipolar transistors can be used as well. In that case the control electrode, the first main electrode and the second main electrode correspond to the base, emitter and collector, respectively, of the bipolar transistor.

What is claimed is:

1. A line driver comprising:
   a driver output terminal for connection to a line to be driven;
   a reference terminal for connection to a reference voltage;
   a current source output transistor having its first main electrode coupled to the reference terminal and its second main electrode coupled to the driver output terminal; and
   a driver stage for providing a drive signal for a control electrode of the current source output transistor in response to the input signal, the driver stage comprising:
   a first resistor connected between the control electrode of the current source output transistor and the reference terminal, a reference transistor having a control electrode, a first main electrode connected to the reference terminal and a second main electrode coupled to an input node, the input node being connected to receive the input signal;
   a second resistor connected between the control electrode of the reference transistor and the reference terminal;
   a first transistor having its control electrode coupled to the input node, its first main electrode coupled to the control electrode of the reference transistor and its second main electrode coupled to a supply voltage terminal; and
   a second transistor having its control electrode coupled to the input node, its first main electrode coupled to the control electrode of the output current source transistor and its second main electrode coupled to the supply voltage terminal.

2. A line driver as claimed in claim 1, further comprising:
   an input terminal for receiving a data signal;
   a first current source coupled to the input node for supplying a current in response to the data signal;
   a third transistor connected between the supply voltage terminal and the input node;
   a second current source coupled between the input node and the reference terminal for supplying a bias current to the third transistor;
   a series arrangement of a fourth transistor, a fifth transistor and a sixth transistor connected between a further node and the reference terminal, said fourth, fifth and sixth transistors each having its control electrode connected to its second main electrode, the control electrode of the fourth transistor being connected to a control electrode of the third transistor and the second main electrode of the fourth transistor being connected to the further node;
   a third current source coupled between the supply voltage terminal and the further node for supplying a bias current to the further node; and
   a seventh transistor connected between the further node and the reference terminal and having a control electrode coupled to the input terminal for receiving the data signal.

3. A line driver as claimed in claim 2, further comprising a ramp generator having an input coupled to the input terminal for receiving the data signal and an output for supplying a ramp signal in response to the data signal, the first current source having a control input coupled to the output of the ramp generator for supplying a ramp shaped current to the input node.

4. A line driver as claimed in claim 1, further comprising a capacitor connected to the input node.

* * * * *